United States Patent
Mozes et al.

(10) Patent No.: US 11,176,480 B2
(45) Date of Patent: Nov. 16, 2021

(54) SYSTEM AND METHOD FOR PARTITIONING MODELS IN A DATABASE

(71) Applicant: ORACLE INTERNATIONAL CORPORATION, Redwood Shores, CA (US)

(72) Inventors: Ari W. Mozes, Lexington, MA (US); Boriana L. Milenova, Reading, MA (US); Marcos M. Campos, Carlsbad, CA (US); Mark A. McCracken, Wakefield, MA (US); Gayathri P. Ayyappan, Bangalore (IN)

(73) Assignee: Oracle International Corporation, Redwood Shores, CA (US)

(*) Notice: Subject to any disclaimer, the term of this patent is extended or adjusted under 35 U.S.C. 154(b) by 827 days.

(21) Appl. No.: 15/225,932

(22) Filed: Aug. 2, 2016

(65) Prior Publication Data

US 2017/0308809 A1   Oct. 26, 2017

Related U.S. Application Data

(60) Provisional application No. 62/325,577, filed on Apr. 21, 2016.

(51) Int. Cl.
*G06N 20/00* (2019.01)
*G06F 16/2458* (2019.01)
(Continued)

(52) U.S. Cl.
CPC .......... *G06N 20/00* (2019.01); *G06F 16/212* (2019.01); *G06F 16/2465* (2019.01);
(Continued)

(58) Field of Classification Search
CPC .............. G06N 20/00; G06F 16/2465; G06F 16/24554; G06F 16/24578
See application file for complete search history.

(56) References Cited

U.S. PATENT DOCUMENTS 9,516,053 B1 * 12/2016 Muddu ................ G06F 16/254
2012/0066260 A1   3/2012 Li et al.
(Continued)

OTHER PUBLICATIONS

Cano et al. ("Towards Geo-Distributed Machine Learning", arXiv:1603.09035v1 [cs.LG], Mar. 30, 2016, pp. 1-10) (Year: 2016).*
(Continued)

*Primary Examiner* — Kakali Chaki
*Assistant Examiner* — Robert Lewis Kulp
(74) *Attorney, Agent, or Firm* — Kraguljac Law Group, LLC

(57) ABSTRACT

Systems, methods, and other embodiments are disclosed for partitioning models in a database. In one embodiment, a set of training data is parsed into multiple data partitions based on partition keys, where the data partitions are identified by the partition keys and are used for training data mining models. The multiple data partitions are analyzed to generate partition metrics data. Algorithm data, identifying at least one algorithm for processing the multiple data partitions, and resources data, identifying available modeling resources for processing the multiple data partitions, are read. The partition metrics data, the algorithm data, and the resources data are processed to generate an organization data structure. The organization data structure is configured to control distribution and processing of the multiple data partitions across the available modeling resources to generate a composite model object that includes a separately trained data mining model for each partition of the multiple partitions.

23 Claims, 6 Drawing Sheets

(51) Int. Cl.
    *G06F 16/2455*     (2019.01)
    *G06F 16/2457*     (2019.01)
    *G06F 16/21*     (2019.01)
    *G06F 16/27*     (2019.01)

(52) U.S. Cl.
    CPC .. *G06F 16/24554* (2019.01); *G06F 16/24578* (2019.01); *G06F 16/278* (2019.01)

(56) References Cited

U.S. PATENT DOCUMENTS

| | | | |
|---|---|---|---|
| 2016/0011911 A1 | 1/2016 | Rangaraju et al. | |
| 2016/0071027 A1* | 3/2016 | Brand | H04L 45/08 706/12 |
| 2016/0078361 A1* | 3/2016 | Brueckner | H04L 67/10 706/12 |

OTHER PUBLICATIONS

Oracle.com ("Chapter 3 Predictive Data Mining Models", Archive. Org Jan. 25, 2015, https://docs.orcale.com/cd/B13789_01/datamine.101/b10698/3predict.htm/, pp. 1-9) (Year: 2015).*

Chakrabarti et al. ("Models and Scheduling Algorithms for Mixed Data and Task Parallel Programs", Journal of Parallel and Distributed Computing 47, 168-184 (1997)) (Year: 1997).*

Lazarevic et al. ("A Software System for Spatial Data Analysis and Modeling", Proceedings of the 33rd Hawaii International Conference on System Sciences, 2000, pp. 1-10) (Year: 2000).*

Hammoud et al. ("Center-of-Gravity Reduce Task Scheduling to Lower MapReduce Network Traffic", 2012 IEEE Fifth International Conference on Cloud Computing, 2012, pp. 49-58) (Year: 2012).*

Okcan et al. ("Processing Theta-Joins using MapReduce"SIGMOD'11, Jun. 12-16, 2011, pp. 949-960) (Year: 2011).*

Xiong Deng ("Dynamic Data Mining: Methodology and Algorithms", PhD Thesis, Imperial College London Department of Computing , Dec. 2010, pp. 1-189) (Year: 2010).*

Oracle (Primary Author: Sarika Surampudi), Oracle Data Mining—User's Guide, 12c Release 1 (12.1) E53115-05, Dynamic Scoring, pp. 1-3, May 2017 downloaded on Dec. 30, 2020 from: https://docs.oracle.com/database/121/DMPRG/GUID-AB32A94A-2D8C-4BBC-89B9-FD432F3A464B.htm#DMPRG774.

Oracle (Primary Author: Mary Beth Roeser), Prediction; Oracle Database—SQL Language Reference 12c Release 1 (12.1) E41329-25, pp. 1-6, downloaded on Dec. 30, 2020 from: https://docs.oracle.com/database/121/SQLRF/functions146.htm#SQLRF06219.

* cited by examiner

SYSTEM AND METHOD FOR PARTITIONING MODELS IN A DATABASE

CROSS REFERENCE TO RELATED APPLICATIONS

This disclosure claims the benefit of U.S. Provisional Patent Application Ser. No. "62/325,577" filed Apr. 21, 2016, titled "System and Method for Partitioning Models in a Database", which is incorporated by reference herein in its entirety.

BACKGROUND

When a data scientist wants to build separate models to capture behavior (e.g., such as consumer purchase behavior per region), the burden is placed on the analyst to devise a mechanism for building, managing, and deploying such models. The database industry does not provide tools to make the effort feasible. As a result, attempts have been made to write complete and customized applications to encapsulate the idea of having separate models to capture behavior. Unfortunately, the manageability and performance of such applications often proves to be less than acceptable.

In the context of data mining functions, a data mining function may be used to identify fraud, predict attrition, find associations between products, etc.). For example, it may be hypothesized that patterns of fraudulent behavior are different in different countries. Perhaps in the United States stolen credit cards are first used at a gas station, while in Italy stolen credit card numbers from receipts are used to buy products on-line (but rarely to buy gas). When looking across the world, the fraudulent events in one country may get "washed out" by non-fraudulent events of the same type in other parts of the world. Non-partitioned models will try to capture the patterns by including the country's impact. However, more complex multivariate patterns may differ when looking at separate pockets of data. Such patterns may be more difficult to identify across a more heterogeneous source.

If there are many pockets, building and managing the models can be burdensome. Image developing an application that predicts fraudulent activity for credit cards with one model per country. The application would be responsible for selecting the correct model when applying it to data. The application would need to handle situations for adding and removing countries to the metadata.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Figure 1:
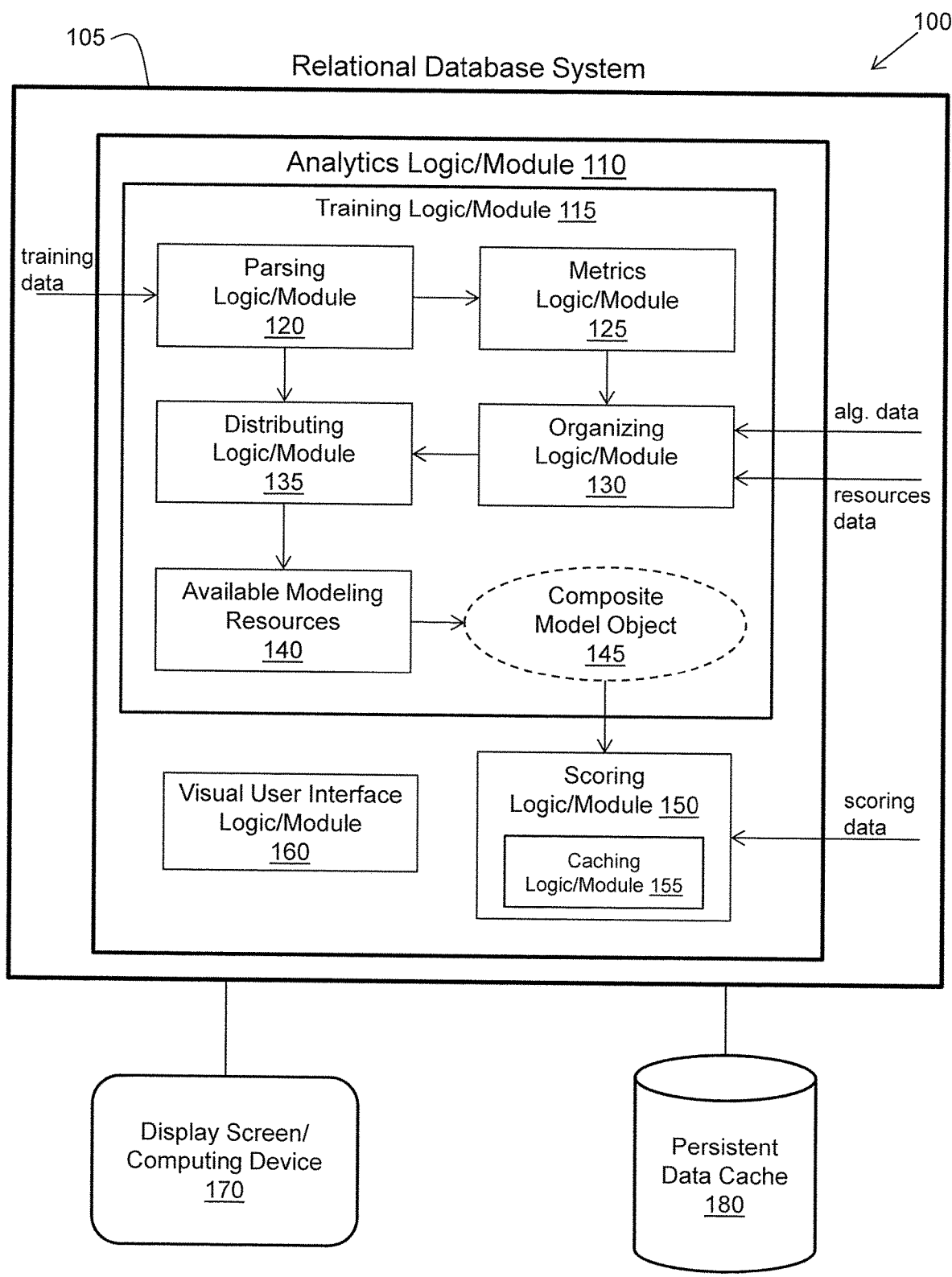
FIG. 1 illustrates one embodiment of a relational database system, having a computing device configured with analytics logic, for generating a composite model object of partitioned data mining models built on partitioned training data, and scoring records of scoring data using the composite model object.

Performance advantages can be attained by bundling separate data mining models into a composite object including:

a. parallelizing a composite model build (intra-partition parallel) when an algorithm has no parallel implementation;

b. reducing memory contention leading to swapping (an hence improved performance) by enabling a simple approach to scoring data in partition order without requiring multiple passes through the original data; and c. reducing memory consumption by sharing common data structures across the individual models within a composite model object.

Computerized systems, computerized methods, and other computerized embodiments are disclosed that provide powerful data mining functionality within a database in a single, secure, and scalable platform for advanced business intelligence. Embodiments embed a collection of machine learning algorithms inside a database where the data is stored. This eliminates data movement and duplication, maintains security, and minimizes latency when going from raw data to valuable information.

A dynamic, data-driven approach to parallelizing builds of models, including intra-partition, inter-partition, and hybrid forms is provided. In particular, support for building data mining models in a database, which are partitioned on a key, is provided. The database framework for mining provides scalable model building and scoring operations for such models. A dynamic caching approach to scoring large models is also disclosed. Support for updating large models in response to changing data or business scenarios is disclosed. When building partitioned data mining models, scoring data using the partitioned data mining models, and updating the partitioned data mining models, performance and usability of a relational database system is greatly improved and simplicity of maintenance is provided.

The ability to dynamically choose a parallelization method on a per-partition basis is provided and allows the database provider to adapt to differences in data characteristics and leverage resources on large systems while minimizing overhead of communication. Also, the ability to create, modify, and drop models as single entities, though they may be composed of thousands of individual models, is provided for usability.

A data mining function specifies a class of problems that can be modeled and solved. Data mining functions fall generally into two categories: supervised and unsupervised. Notions of supervised and unsupervised learning are derived from the science of machine learning, which has been called a sub-area of artificial intelligence. Supervised learning generally results in predictive models. In unsupervised learning, the goal is pattern detection.

Artificial intelligence refers to the implementation and study of systems that exhibit autonomous intelligence or behavior of their own. Machine learning deals with techniques that enable devices to learn from their own performance and modify their own functioning. Data mining applies machine learning concepts to data.

The building of a supervised model involves training, a process whereby the software analyzes many cases where the target value is already known. In the training process, the model "learns" the logic for making the prediction. For example, a model that seeks to identify the customers who are likely to respond to a promotion is trained by analyzing the characteristics of many customers who are known to have responded or not responded to a promotion in the past.

Scoring data represents the actual population to which a model is applied. For example, a model might be built that identifies the characteristics of customers who frequently buy a certain product. To obtain a list of customers who shop at a certain store and are likely to buy a related product, the model might be applied to the customer data for that store. In this case, the store customer data is the scoring data.

An algorithm is a mathematical procedure for solving a specific kind of problem. Data mining can support at least one algorithm for each data mining function. For some functions, a choice can be made from among several algorithms. For example, data mining may support four classification algorithms. Each data mining model is produced by a specific algorithm. Some data mining problems can best be solved by using more than one algorithm. This necessitates the development of more than one model. For example, a feature extraction model may first be used to create an optimized set of predictors, then a classification model may be used to make a prediction on the results.

The following terms are used herein with respect to various embodiments.

The term "training data", as used herein, refers to data representing many cases of a population (e.g., where a target value is already known in supervised approaches), and is used in a build process to generate (train) a data mining model.

The term "scoring data", as used herein, refers to data that represents an actual population to which a data mining model is applied.

The term "composite model object", as used herein, refers to a population of partitioned data mining models persisted in a relational database system as a single computerized object.

The term "processing node", as used herein, refers to a specified portion of available modeling resources, where the available modeling resources include multiple processing nodes, and where a single processing node includes one or more processors and memory.

The term "data mining model", as used herein, refers to a computerized model developed using training data, and which can be applied to scoring data to extract useful information (e.g. predictive information, grouping information, feature information).

The term "data field", as used herein, refers to one or more columns or expressions derived from a set of data.

The term "partition", as used herein, refers to a portion of data in a dataset, or a data mining model in a composite model object. A partition is based on one or more data fields, where values of the one or more data fields are used to identify a portion such that a data mining model can be generated for the partition. A dataset may be partitioned using, for example, range partitioning, hash partitioning, or enumerated list-type partitioning through a new data definition language (DDL) statement. For example, in one embodiment, range partitioning may be used such that separate models are built on different time-windows of data to capture different patterns that emerge.

The term "partition key", as used herein, refers to identifying data that identifies a partition in a dataset (e.g., all customer data associated with the state of Ohio in a set of training data), or identifying data that identifies a data mining model in a composite model object (e.g., a data mining model for the state of Ohio). A partition, as identified by a partition key, may be referred to as "a data partition" (e.g., with respect to a portion of training data or scoring data), or just "a partition" (e.g., with respect to a portion of training data, scoring data, or to a data mining model).

The terms "persist", "persisted", "persisting", and "persistent" are used herein when referring to a set of models (e.g., a composite model object) having a non-volatile on-disk or in-data cache representation that can, for example, be examined by a user, exported and imported, referenced by different data mining function (DMF) queries at different times (including between database shutdown/startup), and have certain data definition language (DDL) operations performed on the models.

FIG. 1 illustrates one embodiment of a relational database system 100, having a computing device 105 configured with analytics logic 110, for generating a composite model object of partitioned data mining models built on partitioned training data, and for scoring records of partitioned scoring data using the composite model object. For example, in one embodiment, analytics logic 110 may be part of a larger computer application (e.g., a computerized database application), configured to help analysts and data scientists extract useful information from large sets of data. Analytics logic 110 is configured to computerize the process of generating and managing a large number of data mining models that are trained on large sets of training data and applied to large sets of scoring data.

In one embodiment, the system 100 is a computing/data processing system including an application or collection of distributed applications for enterprise organizations. The applications and computing system 100 may be configured to operate with or be implemented as a cloud-based networking system, a Software as a Service (SaaS) architecture, or other type of computing solution.

With reference to FIG. 1, in one embodiment, analytics logic 110 is implemented on the computing device 105 and includes logics or modules for implementing various functional aspects of analytics logic 110. In one embodiment, analytics logic 110 includes parsing logic/module 120, metrics logic/module 125, organizing logic/module 130, distributing logic/module 135, available modeling resources 140 (for building a composite model object 145), scoring logic/ module 150 (for applying a composite model object 145, and which includes caching logic/module 155), and visual user interface logic/module 160.

Other embodiments may provide different logics or combinations of logics that provide the same or similar functionality as analytics logic 110 of FIG. 1. In one embodiment, analytics logic 110 is an executable application including algorithms and/or program modules configured to perform the functions of the logics. The application is stored in a non-transitory computer storage medium. That is, in one embodiment, the logics of analytics logic 110 are implemented as modules of instructions stored on a computer-readable medium.

The relational database system 100 also includes a display screen 170 operably connected to the computing device 105. In accordance with one embodiment, the display screen 170 is implemented to display views of and facilitate user interaction with a graphical user interface (GUI) generated by visual user interface logic 160, for example, for selecting one or more fields (e.g., zip codes, area codes, states, etc.) upon which training data can be partitioned, selecting algorithms for processing, and adding or removing partitions from a composite model object. Such selections may be made via an application program interface (API), in accordance with another embodiment. In one embodiment, once one or more data fields are selected, partitioning keys may be generated based on the selected data fields. The graphical user interface may be associated with an analytics algorithm and visual user interface logic 160 may be configured to generate the graphical user interface. Partition keys may also be specified by a user through a DDL statement, by an automated suggestion from the database, or based on a partition table, in accordance with various embodiments.

In one embodiment, the relational database system 100 is a centralized server-side application that provides at least the functions disclosed herein and that is accessed by many users via computing devices/terminals communicating with the relational database system 100 (functioning as the server) over a computer network. Thus the display screen 170 may represent multiple computing devices/terminals that allow users to access and receive services from analytics logic 110 via networked computer communications.

In one embodiment, the relational database system 100 further includes persistent data cache 180 operably connected to the computing device 105 and/or a network interface to access the persistent data cache 180 via a network connection. In accordance with one embodiment, the persistent data cache 180 is configured to persist a composite model object 145 containing multiple data mining models. The training, building, and application of such a composite model object 145 is discussed in detail later herein.

Referring back to the logics of analytics logic 110 of FIG. 1, in one embodiment, visual user interface logic 160 is configured to generate a graphical user interface (GUI) to facilitate user interaction with analytics logic 110. For example, visual user interface logic 160 includes program code that generates and causes the graphical user interface to be displayed based on an implemented graphical design of the interface. In response to user actions and selections via the GUI, associated aspects of analytics logic 110 may be manipulated.

In one embodiment, visual user interface logic 160 is configured to facilitate selecting one or more data fields upon which training data is to be partitioned. For example, visual user interface logic 160 may facilitate manual selection of a column name of a set of training data, where the column name specifies the data field upon which the set of training data is to be partitioned such that a data mining model can be generated for each partition. For example, a set of training data may include data associated with customers, where one column of the set of training data specifies a state in which the customers reside. A user can select the data field (i.e., the column name "state") upon which to partition the customers. As a result, analytics logic 110 can partition the set of training data based on states (e.g., Ohio, California, Texas, etc.) and train a separate data mining model for each state. Other data fields may be selected instead such as, for example, customer age or customer gender, or a combination of columns based on gender and marital status, or an expression such as binned ranges of customer age. In other embodiments, data fields for partitioning may come from underlying table partitioning, or may be automatically determined by the system as a means to improve overall model accuracy.

In one embodiment, visual user interface logic 160 is configured to facilitate the adding and removing of partitions from a partitioned composite model object 145. For example, a composite model object 145 may include a separate data mining model (a partition) for every state (i.e., all 50 states of the United States). A user may decide to remove the partitions corresponding to the states of, for example, Rhode Island, Delaware, New Hampshire, and Vermont from the composite model object 145. Alternatively, a user may decide to add, for example, Puerto Rico to the composite model object 145 (treating Puerto Rico as if it were a state).

As another example, a small telecom provider may be doing business in multiple countries in the European Union (EU) and may want to identify reasons for customer churn. As new countries are added to the EU (e.g., Turkey), new partitions can be added to the existing model. However, the application which uses the deployed model would not have to be updated, and nothing would have to change for the models that cover the existing EU countries. Also, a partition may be removed for a country that is no longer in the EU (e.g., Great Britain). In addition, there may be, for example, a new telecom competitor in France that is pulling customers away from the small telecom provider. The small telecom provider may rebuild the France partition to find new patterns which correspond to customers that are leaving (since the patterns may have changed). A model enables all of the changes described herein without impacting the way in which data is scored. All of the associated structured query language (SQL) can remain since the reference is only to the composite model object, and the dynamic identification of a relevant partition is handled by the system.

Analytics logic 110 is structured to readily add and remove models to a composite model object 145 without having to re-build the entire composite model object 145 or any of the pre-existing data mining models of the composite model object 145. Furthermore, analytics logic 110 is configured to re-train one or more data mining models without having to re-build the entire composite model object 145 or any of the other pre-existing data mining models of the composite model object 145 that are not being changed. Therefore, maintainability of the relational database system is greatly enhanced.

Referring again to FIG. 1, in one embodiment, parsing logic 120 is configured to read a set of training data within the relational database system 100. The training data may represent historical information of a business corresponding to, for example, sales, customers, products, etc. The set of training data may include multiple data partitions identified by partition keys and is used for training data mining models. A partition key, in this context, refers to identifying data that identifies a data partition in a dataset (e.g., all customer data associated with the state of Ohio in a set of training data). Parsing logic 120 is also configured to parse the set of training data into the multiple data partitions based on the partition keys (e.g., a separate partition for each of the states).

However, in another context, a partition key may refer to identifying data that identifies a data mining model in a composite model object 145 (e.g., a data mining model for the state of Ohio). In one embodiment, a partition key (i.e., the identifying data) may be the same for a data partition (e.g., all customer data associated with the state of Ohio in a set of training data) and for a corresponding data mining model (e.g., a data mining model for the state of Ohio) in a composite model object 145.

In one embodiment, metrics logic 125 is configured to analyze the multiple data partitions, as parsed by parsing logic 120, to generate partition metrics data. The partition metrics data can include a number of the partitions of the multiple partitions (e.g., 1024 partitions), a size of each partition of the multiple partitions (e.g., number of rows in the training data that are mapped to each partition), and a respective value for the partition key associated with each partition of the multiple partitions (e.g., customer data associated with the state of Ohio). As discussed later herein, the partition metrics data is used in determining how the multiple partitions are to be distributed and processed to generate data mining models.

In one embodiment, organizing logic 130 is configured to read the partition metrics data, algorithm data, and resources data. The algorithm data identifies one or more algorithms to be used for processing the multiple data partitions to form data mining models. The resources data identifies the available modeling resources 140 that are available for processing the multiple data partitions. The one or more algorithms and/or the available modeling resources 140 may be specified by a user via the graphical user interface provided by visual user interface logic 160, in accordance with one embodiment. In another embodiment, the one or more algorithms and/or the available modeling resources 140 may be determined automatically by the relational database system 100. In still another embodiment, the available modeling resources 140 may be determined by a system manager of the relational database system 100.

In one embodiment, the one or more algorithms may include, for example, a classification algorithm, a regression algorithm, a clustering algorithm, a feature extraction algorithm, an association rules algorithm, an attribute importance algorithm, a time series algorithm, or an anomaly detection algorithm. Other algorithms are possible as well. In one embodiment, the available modeling resources 140 include multiple processing nodes. Each processing node may include one or more processors and memory, in accordance with one embodiment. The processing nodes may exist internally to the relational database system 100, externally to the relational database system 100 (e.g., "in the cloud"), or both internally and externally to the relational database system 100, in accordance with various embodiments.

Organizing logic 130 is also configured to analyze the partition metrics data, the algorithm data, and the resources data and generate an organization data structure based on the analysis. The organization data structure is configured with control data to control the distribution and processing of the multiple data partitions across the available modeling resources to generate the composite model object 145. The organization data structure can control the distribution and processing on a partition-by-partition basis, in accordance with one embodiment. Therefore, organizing logic 130 embodies the "smarts" of determining how data partitions should be distributed and processed to efficiently use the relational database system 100. In one embodiment, organizing logic 130 can adapt at runtime to changes in the available system resources. For example, if resources are overused on the system, organizing logic 130 can change the partition distribution approach in the organization data structure to adapt.

In one embodiment, distributing logic 135 is configured to read the organization data structure from organizing logic 130 and actively distribute the multiple data partitions across the available modeling resources under the control of the organization data structure. For example, in one embodiment, the organization data structure may direct distributing logic 135 to distribute data slices of a first data partition (e.g., corresponding to the state of Ohio) across all of the multiple processing nodes of the available modeling resources 140. Once the first data partition is distributed and processed across all of the processing nodes to form a corresponding first data mining model, the other data partitions may be successively distributed for processing (i.e., one partition after another) by distributing logic 135 in a similar manner. The resultant multiple data mining models may then be aggregated into a composite model object 145. This distributing technique may be described as "intra-partition parallelization".

In another embodiment, the organization data structure may direct distributing logic 135 to distribute each data partition of the multiple data partitions (e.g., a data partition for each state) to a different processing node of the multiple processing nodes of the available modeling resources 140. In this manner the multiple data partitions, once distributed, can be processed simultaneously to generate a data mining model for each data partition. The data mining models can then be aggregated into a composite model object 145. This distributing technique may be described as "inter-partition parallelization".

Other ways of distributing and processing the multiple data partitions are possible as well, in accordance with other various embodiments. In one embodiment, organizing logic 130 is configured to analyze the partition metrics data, the algorithm data, and the resources data in a thorough manner to flexibly generate an organization data structure that allows for the data partitions to be distributed and processed in any of multiple possible ways, depending on the nature of the partitions, algorithms, and available resources. Such flexibility ensures that the available modeling resources 140 are being used efficiently. For example, in one embodiment, a hybrid approach that combines intra-partition parallelization and inter-partition parallelization may be employed.

In one embodiment, the available modeling resources 140 are configured to generate the composite model object 145 by executing the one or more algorithms on the multiple data partitions, as controlled by the organization data structure (e.g., intra-partition, inter-partition, hybrid). The composite model object 145, once generated by the available modeling resources 140 under the control of the organization data structure, includes a separately trained data mining model for each partition of the multiple data partitions. Therefore, the composite model object 145 is a set of models, with each data mining model corresponding to a partition of the composite model object 145.

The available modeling resources 140 are also configured to persist the resultant composite model object 145 in the persistent data cache 180 of the relational database system 100, in accordance with one embodiment. By persisting the composite model object 145 in the data cache 180, the composite model object 145 can be examined by a user, exported and imported, referenced by different data mining function (DMF) queries at different times (including between database shutdown/startup), and have certain data definition language (DDL) operations performed on the composite model object.

Once generated and persisted in the relational database system 100, the composite model object 145 can be used to "score" new data (e.g., to perform predictions, make classifications/discernments, or extract features, etc.) depending on the nature of the data mining models of the composite model object 145. For example, in one embodiment, the composite model object 145 may include a data mining model for each state of the United States, where each data mining model is configured to discern between customers who are likely to leave a telecommunications provider for the state within the next year and customers who are likely to stay with the telecommunications provider for that state beyond the next year.

In one embodiment, scoring logic 150 is configured to access and read a set of scoring data within the relational database system 100 and parse the scoring data into data partitions based on partition keys associated with the scoring data. The partition keys identify the data partitions of the scoring data. Scoring logic 150 is also configured to load the corresponding data mining models of the composite model object 145 within the relational database system 100 based on the partition keys present in the scoring data. That is, each row to be scored is provided, as input, to a corresponding data mining model loaded into memory and having a same partition key. In another embodiment, the scoring data is not partitioned, but is dynamically loaded prior to applying the composite model.

The corresponding data mining models may be dynamically loaded into memory based on the partition keys observed. When memory is limited, various cache replacement policies can be applied to try to optimize the amount of re-use of in-memory data structures while not over-using memory. In addition, a user override may be provided which causes the data to be clumped by partition such that each partition will only need to be loaded once (and all rows for that partition are scored one after the other). The user override is valuable for the case where a scoring dataset requires loading a large number of partitions, but memory available for caching the partitions is limited.

For example, in one embodiment, caching logic 155 of scoring logic 150 is configured to examine the data partitions of the scoring data and bring the data partitions and corresponding data mining models into memory in a logical manner for processing. A data mining model is not loaded into memory until it is to be used for processing scoring data. In one embodiment, caching logic 155 is configured to "age out" a particular data mining model from memory when, as scoring data is being read and scored, the particular data mining model is no longer being used much. In this way, scoring logic 150 can automatically manage the loading of data mining models and scoring data into limited resources to efficiently use the resources. Other cache replacement policies are possible as well, in accordance with other embodiments.

As an example, if the scoring data includes a large amount of data from the state of Texas to be scored, caching logic 155 may determine to hold the Texas data mining model in memory so that it is available to process the many rows of Texas scoring data as they arrive. Subsequently, caching logic 155 may quickly remove from memory rarely used data mining models (e.g., the memory for the Rhode Island data mining model may be released after scoring a single row associated with Rhode Island, under the assumption that there will be a long delay until another row from Rhode Island is observed). In this way, resources of the relational database system may be used efficiently.

In one embodiment, memory is used as a container for more than models. The memory may be used for many other database objects, which provides benefits beyond that of a standalone system. When more models need to be loaded into memory, the system can potentially choose to age out some other entity (e.g., a cached SQL cursor) rather than another model from the same composite object. The database may be an established product and there may be significant resources that are dedicated to the database. Therefore, larger than normal resources (memory) may be leveraged to more efficiently complete an operation that involves scoring via a model. The leveraged resources may be "given back" after the operation is completed. However, it is possible that some other operation that requires memory would lead to a model being aged out. In one embodiment, a model (or some other item) is only removed from memory when space is needed for a new item and there is no free memory available.

In this manner, analytics logic 110 is configured to generate a composite model object of partitioned data mining models built on partitioned training data, and score records of partitioned scoring data using the composite model object.

Figure 2:
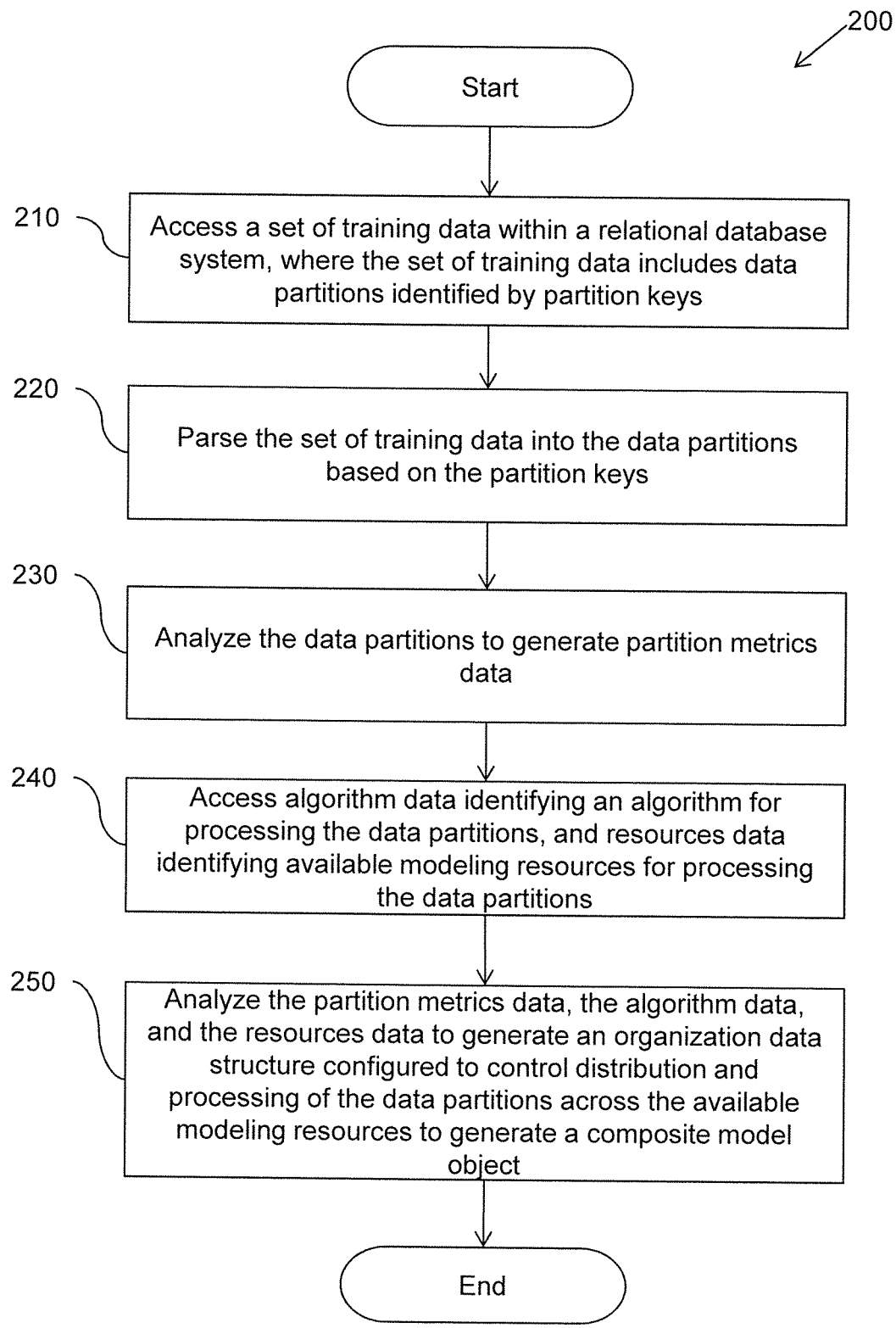
FIG. 2 illustrates one embodiment of a method, which can be performed by the analytics logic of the relational database system of FIG. 1, to generate an organization data structure to control distribution and processing of data partitions of training data across available modeling resources when generating a composite model object.

FIG. 2 illustrates one embodiment of a method 200, which can be performed by analytics logic 110 of the relational database system 100 of FIG. 1, to generate an organization data structure to control distribution and processing of data partitions of training data across available modeling resources when generating a composite model object. Method 200 describes operations of analytics logic 110 and is to be performed by analytics logic 110 of FIG. 1, or by a computing device configured with an algorithm of the method 200. For example, in one embodiment, method 200 is implemented by a computing device configured to execute a computer application. The computer application is configured to process data in electronic form and includes stored executable instructions that perform the functions of method 200.

Method 200 will be described from the perspective that data mining models can be trained up in a relational database system and aggregated into a composite model object as models which can be persisted in data cache of the relational database system. Each data mining model corresponds to a different data partition of a set of training data, and a dynamic, data-driven approach to parallelizing and/or serializing builds of the models is provided.

Upon initiating method 200, at block 210, a set of training data is accessed and read within a relational database system. The set of training data includes data partitions identified by partition keys. The training data may correspond to, for example, historical customer data for a retail company that includes sales data as well as demographic data associated with the customers. Other types of training data are possible as well. At block 220, the set of training data is parsed into the data partitions based on the partition keys. The data partitions are used for building (training up) data mining models. In accordance with one embodiment, parsing logic 120 of analytics logic 110 of FIG. 1 reads and parses the set of training data.

At block 230, the data partitions are analyzed within the relational database system to generate partition metrics data. The partition metrics data include a number of partitions in the training data, a size of each partition in the training data, and a respective value for the partition key associated with each partition in the training data. Other partition metrics data may be possible as well, in accordance with other embodiments. In accordance with one embodiment, metrics logic 125 of analytics logic 110 of FIG. 1 is configured to generate the partition metrics data.

At block 240, algorithm data and resources data are accessed and read within the relational database system. The algorithm data identifies one or more algorithms and the resources data identifies available modeling resources to be used for processing the data partitions to form a composite model object of partitioned data mining models. In accordance with one embodiment, organizing logic 130 of analytics logic 110 of FIG. 1 is configured to access and read the algorithm data and the resources data.

At block 250, the partition metrics data, the algorithm data, and the resources data are analyzed to generate an organization data structure. The organization data structure is configured to control distribution and processing of the data partitions across the available modeling resources to generate a composite model object that includes a separately trained data mining model for each data partition. In accordance with one embodiment, organization logic 130 of analytics logic 110 of FIG. 1 is configured to generate the organization data structure. Furthermore, in one embodiment, organization logic 130 can adapt to changes in resources data (e.g., while the composite model-build process is occurring).

In one embodiment, the available modeling resources include multiple processing nodes. The multiple processing nodes may be internal to the relational database system (e.g., processing nodes of available modeling resources 140 of FIG. 1) and/or external to the relational database system. When external to the relational database system, a processing node can be accessed by the relational database system via computerized network communications. Each processing node may include one or more processors and memory, in accordance with one embodiment.

As an example, based on the analysis of the partition metrics data, the algorithm data, and the resources data at block 250, each data partition of a set of training data may be distributed and processed, one at a time across the multiple processing nodes. That is, a first data partition may be parallelized (distributed and processed) across the multiple processing nodes to form a first data mining model. A second data partition may be parallelized (distributed and processed) across the multiple processing nodes to form a second data mining model, and so forth, until all of the data partitions are processed to form a composite model object having a separate data mining model corresponding to each data partition. Again, the distributing and processing is performed under the control of the organization data structure which is configured to use the available and changing modeling resources in an efficient manner. Details of one embodiment of how to decide to distribute and process a set of training data are provided herein with respect to FIG. 6.

Figure 3:
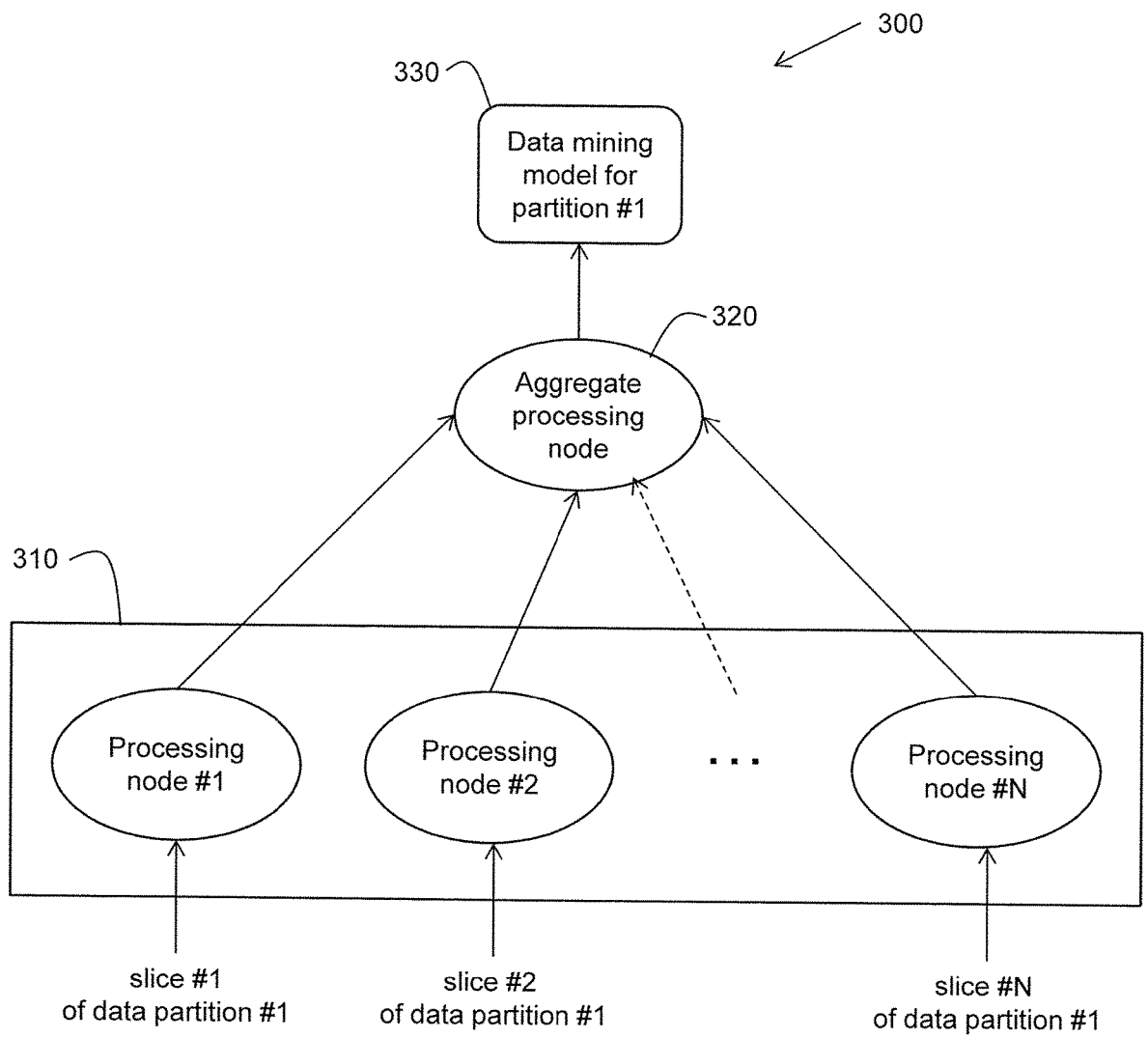
FIG. 3 graphically illustrates an example embodiment of a first process of distributing and processing a data partition across multiple processing nodes of available modeling resources.

FIG. 3 graphically illustrates an example embodiment of an intra-partition process 300 of distributing and processing a data partition across multiple processing nodes of available modeling resources. As shown in FIG. 3, data slices of partition #1 are distributed across N processing nodes 310 of the available modeling resources (i.e., across processing nodes 1 to N). Each processing node processes a slice of data partition #1 and provides the result to an aggregate processing node 320. Many algorithms use synchronization and communication to build the model when running in parallel. That is, there are iterations that occur to build a single model, and each iteration starts with global information from the previous iteration. The aggregate processing node 320 aggregates all of the results from the processing nodes 1 to N into a data mining model 330 for data partition #1. Such a process 300 may be serially repeated for each data partition in a set of training data to generate multiple data mining models that are then aggregated into a composite model object. The resultant composite model object may be persisted in data cache (e.g., persistent data cache 180 of FIG. 1).

As another example, based on the analysis of the partition metrics data, the algorithm data, and the resources data at block 250, each data partition of the training data may be distributed to a different processing node of the available modeling resources (e.g., available modeling resources 140 of FIG. 1). The data partitions may then be processed concurrently by their respective processing nodes to generate a composite model object that includes multiple data mining models. Each data mining model corresponds to a different data partition of the set of training data. The distributing and processing is performed under the control of the organization data structure which is configured to use the available modeling resources in an efficient manner. In the case where there are N partitions and M processing nodes (M<N), each processing node is responsible for zero or more partitions, in accordance with one embodiment.

Figure 4:
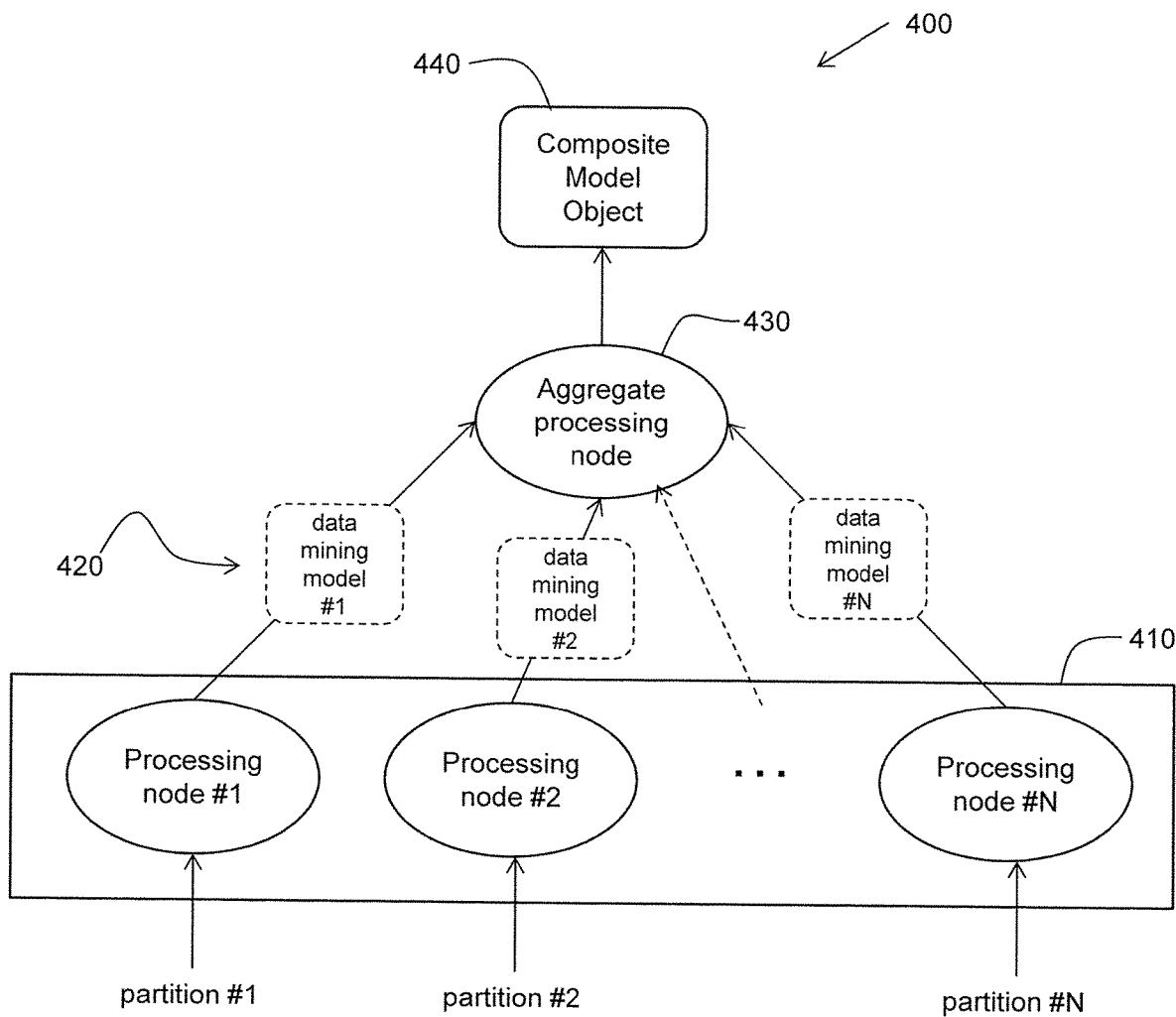
FIG. 4 graphically illustrates an example embodiment of a second process of distributing and processing multiple data partitions across multiple processing nodes of available modeling resources.

FIG. 4 graphically illustrates an example embodiment of an inter-partition process 400 of distributing and processing multiple data partitions across multiple processing nodes of available modeling resources. As shown in FIG. 4, data partitions 1 to N are distributed across N processing nodes 410 of the available modeling resources (i.e., across processing nodes 1 to N). Each processing node processes a data partition to generate a data mining model (data mining models 1 to N) and provides the data mining models 420 to an aggregate processing node 430. The aggregate processing node 430 aggregates the data mining models 1 to N into a composite model object 440 having the data mining models 420. The resultant composite model object 440 may be persisted in data cache (e.g., persistent data cache 180 of FIG. 1).

As another example, some combination (hybrid) of the two examples provided above may be employed, based on the analysis of the partition metrics data, the algorithm data, and the resources data at block 250. Other ways of distributing and processing the data partitions are possible as well, in accordance with other embodiments. For example, in one embodiment, pairs of data partitions may each be distributed across different portions of the processing nodes and processed concurrently.

In this manner, method 200 provides extensive flexibility in generating an organization data structure to control the distribution and processing of data partitions of a set of training data. Based on an analysis of the metrics of the data partitions, the type of algorithm(s) to be used to process the data partitions, and the available modeling resources for processing the data partitions using the algorithm(s), an organization data structure can be generated that controls distribution and processing of the data partitions in a manner that makes efficient use of the available modeling resources.

Figure 5:
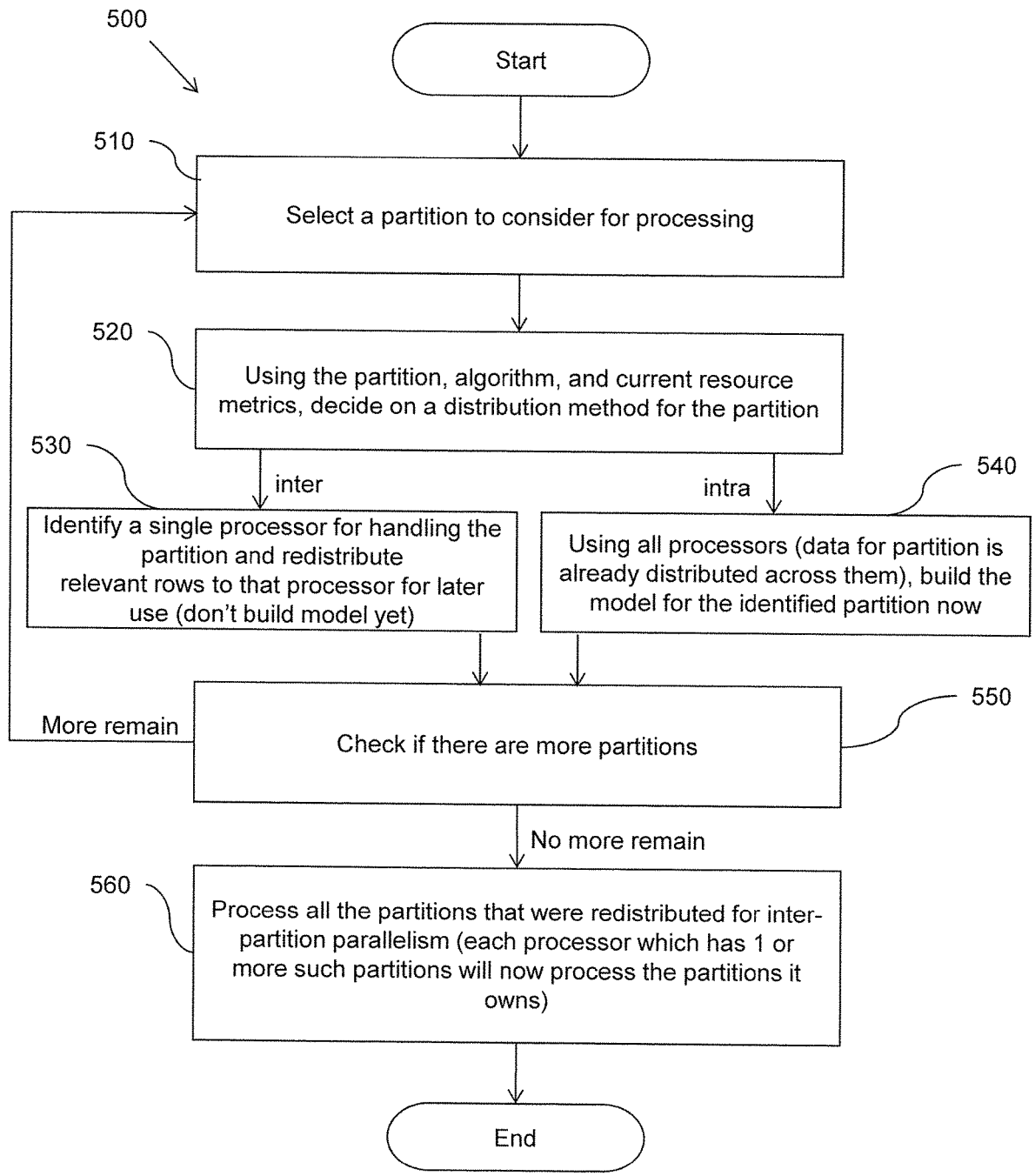
FIG. 5 illustrates one embodiment of a portion of the method of FIG. 2, which can be performed by the analytics logic of the relational database system of FIG. 1, to determine how to distribute and process data partitions of training data across available modeling resources.

FIG. 5 illustrates one embodiment of a portion 500 of the method 200 of FIG. 2, which can be performed by the analytics logic 110 of the relational database system 100 of FIG. 1, to determine how to distribute and process data partitions of training data across available modeling resources. At block 510, a partition is selected for consideration for processing.

At block 520, a distribution method for the partition is decided upon based on the partition metrics, the algorithm, and the current resource metrics (resource data). For example, if (100×the number of rows in the partition) is less than the number of available processors (processing nodes), then redistribute for inter-partition parallelism to avoid the overhead of computing the small partition in parallel. As another example, if the algorithm is likely to require greater than 100 iterations and (1000×the number of rows in the partition) is less than the number of available processors, redistribute for inter-partition parallelism to avoid the overhead of computing the small partition in parallel for a highly-iterative algorithm. As a further example, if the number of partitions is less than the number of available processors (e.g., <2) and the number of rows in the partition is greater than 100, redistribute for intra-partition parallelism to keep the machine busy.

As another example, if the number of rows in a partition is less than a constant (e.g., 100,000), then inter-partition parallelism is employed. If the number of rows in a partition is greater than a constant (e.g., 10,000,000), then intra-partition parallelism is employed. In one embodiment, a hidden parameter can be set to impact the threshold for partition row count used as a determination of inter-partition parallelism or intra-partition parallelism. If the number of rows in a partition does not force either inter-partition parallelism or intra-partition parallelism, then the number of partitions is compared to the number of available processors. If the number of partitions is less than the number of available processors, then intra-partition parallelism is employed (otherwise, inter-partition parallelism is employed).

Other distribution methods may be decided upon as well, in accordance with other embodiments. For example, run-time load may be leveraged to help decide how to distribute and process data partitions. The run-time load may be a processing load and/or a memory load that is reflected in the current resource metrics, which can dynamically change over time.

At block 530, when the decided distribution method is inter-partition at block 520, identify a single processor for handling the partition and redistribute relevant rows to that processor for later use (don't build the model yet). At block 540, when the decided distribution method is intra-partition, distribute the partition across all of the processors to use all the processors to build the model for the identified partition. In one embodiment, all the data for the partition has previously been distributed across all of the processors in a random manner and, at block 540, all the processors can immediately be used to build the model for the identified partition.

At block 550, a check is performed to determine if there are more partitions to process. When there are more partitions to process, the method reverts to block 510. Otherwise, the method proceeds to block 560. At block 560, all of the partitions that were redistributed for inter-partition parallelism are processed. That is, each processor which has one or more partitions assigned will process the partitions.

In one embodiment, the portion 500 of the method 200 results in an organization data structure which ultimately controls the distribution and processing of the data partitions. The organization data structure may be dynamic in that the organization data structure can change as partitions are being considered at run time. In this manner, the multiple data partitions of a set of training data can be dynamically distributed and processed to efficiently use available resources and generate a composite model object that includes a separately trained data mining model for each partition of the multiple data partitions.

Computing Device Embodiment

Figure 6:
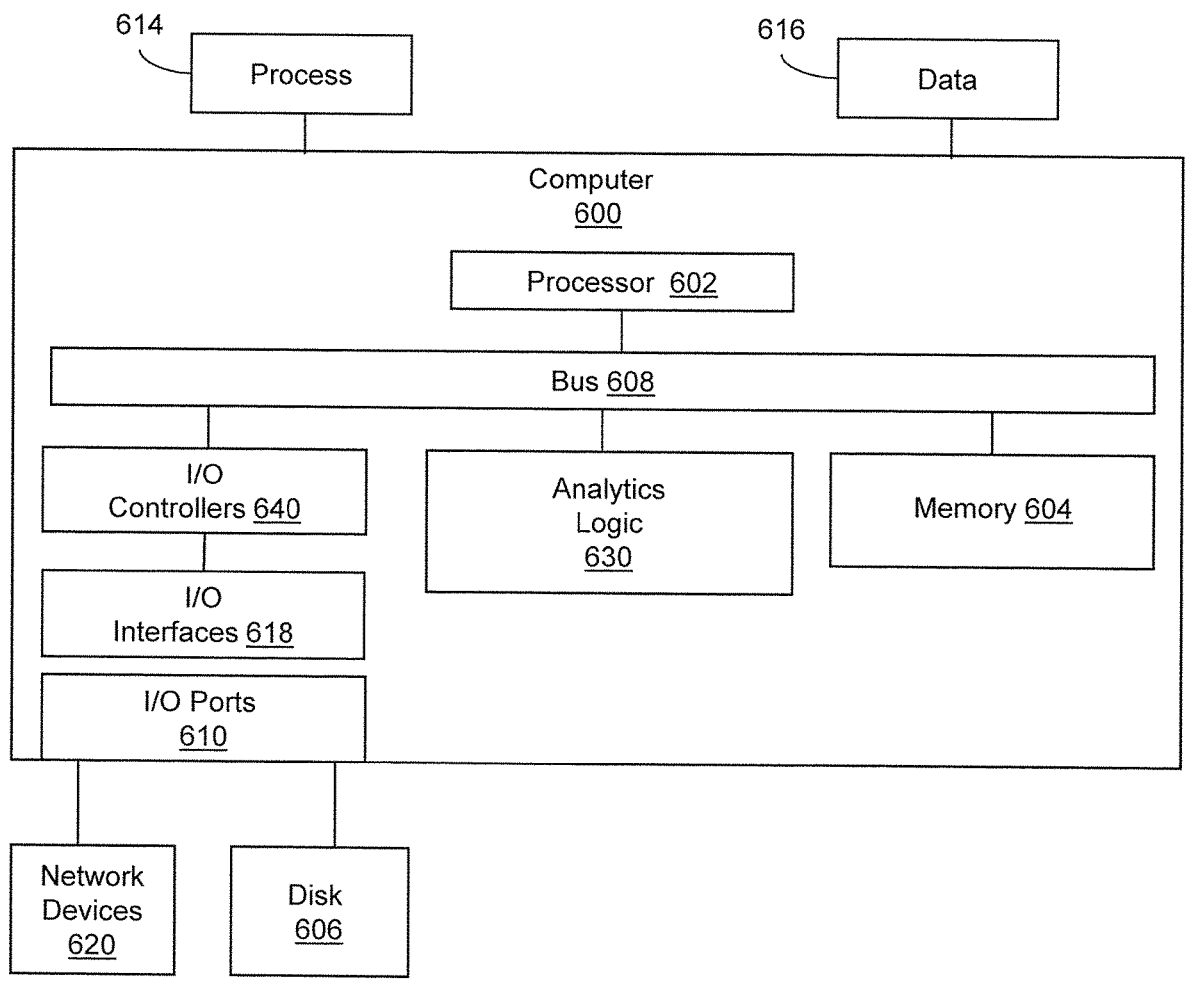
FIG. 6 illustrates one embodiment of a computing device upon which the analytics logic of a computing system (e.g., a relational database system) may be implemented.

FIG. 6 illustrates an example computing device that is configured and/or programmed with one or more of the example systems and methods described herein, and/or equivalents. FIG. 6 illustrates one embodiment of a computing device upon which analytics logic of a computing system (e.g., a relational database system) may be implemented. The example computing device may be a computer 600 that includes a processor 602, a memory 604, and input/output ports 610 operably connected by a bus 608.

In one example, the computer 600 may include analytics logic 630 (corresponding to analytics logic 110 from FIG. 1) which is configured to generate a composite model object of data mining models built on partitioned training data, perform maintenance operations on the composite model object, and score records of scoring data using the composite model object. In different examples, logic 630 may be implemented in hardware, a non-transitory computer-readable medium with stored instructions, firmware, and/or combinations thereof. While the logic 630 is illustrated as a hardware component attached to the bus 608, it is to be appreciated that in other embodiments, logic 630 could be implemented in the processor 602, a module stored in memory 604, or a module stored in disk 606.

In one embodiment, logic 630 or the computer 600 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to facilitate the generating of a composite model object of data mining models built on partitioned training data, perform maintenance operations on the composite model object, and the scoring of records of scoring data using the composite model object. The means may also be implemented as stored computer executable instructions that are presented to computer 600 as data 616 that are temporarily stored in memory 604 and then executed by processor 602.

Logic 630 may also provide means (e.g., hardware, non-transitory computer-readable medium that stores executable instructions, firmware) to generate a composite model object of data mining models built on partitioned training data, perform maintenance operations on the composite model object, and score records of scoring data using the composite model object.

Generally describing an example configuration of the computer 600, the processor 602 may be a variety of various processors including dual microprocessor and other multi-processor architectures. A memory 604 may include volatile memory and/or non-volatile memory. Non-volatile memory may include, for example, ROM, PROM, and so on. Volatile memory may include, for example, RAM, SRAM, DRAM, and so on.

A storage disk 606 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a Zip drive, a flash memory card, a memory stick, and so on. Furthermore, the disk 606 may be a CD-ROM drive, a CD-R drive, a CD-RW drive, a DVD ROM, and so on. The memory 604 can store a process 614 and/or a data 616, for example. The disk 606 and/or the memory 604 can store an operating system that controls and allocates resources of the computer 600.

The computer 600 may interact with input/output devices via the i/o interfaces 618 and the input/output ports 610. Input/output devices may be, for example, a keyboard, a microphone, a pointing and selection device, cameras, video cards, displays, the disk 606, the network devices 620, and so on. The input/output ports 610 may include, for example, serial ports, parallel ports, and USB ports.

The computer 600 can operate in a network environment and thus may be connected to the network devices 620 via the i/o interfaces 618, and/or the i/o ports 610. Through the network devices 620, the computer 600 may interact with a network. Through the network, the computer 600 may be logically connected to remote computers. Networks with which the computer 600 may interact include, but are not limited to, a LAN, a WAN, and other networks.

Systems, methods, and other embodiments have been described that are configured to generate a composite model object of data mining models built on partitioned training data, perform maintenance operations on the composite model object, and score records of scoring data using the composite model object. In one embodiment, parsing logic is configured to read a set of training data within a relational database system. The set of training data includes identified partition keys and is used for training data mining models. The parsing logic is also configured to parse the set of training data into the multiple data partitions based on the partition keys. Metrics logic is configured to analyze the multiple data partitions to generate partition metrics data. The partition metrics data includes a number of partitions of the multiple data partitions, a size of each partition of the multiple data partitions, and a respective value for the partition key associated with each partition of the multiple data partitions. Organizing logic is configured to read the partition metrics data, algorithm data identifying an algorithm for processing the multiple data partitions, and resources data identifying available modeling resources for processing the multiple data partitions. Organizing logic is also configured to analyze the partition metrics data, the algorithm data, and the resources data to generate an organization data structure. The organization data structure is configured to control distribution and processing of the multiple data partitions across the available modeling resources to generate a composite model object that includes a separately trained data mining model for each partition of the multiple data partitions.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer software embodied in a non-transitory computer-readable medium including an executable algorithm configured to perform the method.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C. § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
USB: universal serial bus.
WAN: wide area network.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). An operable connection may include one entity generating data and storing the data in a memory, and another entity retrieving that data from the memory via, for example, instruction control. Logical and/or physical communication channels can be used to create an operable connection.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C. § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A computer-implemented method performed by at least a processor for executing instructions from a persistent data cache, the method comprising:

storing a set of model training data and a composite model object persistently in a relational database management system, wherein a partitioning scheme for the composite model object is associated with a partitioning key, a partitioning technique, and a plurality of partitions;

parsing a set of scoring data within the relational database system into at least one scoring data partition based on at least one scoring data partition key associated with the set of scoring data, wherein the at least one scoring data partition is identified by the at least one scoring data partition key and is dynamically loaded into a persistent data cache of the relational database system;

upon determining that a respective component of the composite model object that corresponds to each partition of the at least one scoring data partition will be used for processing the at least one scoring data partition, dynamically loading the respective component of the composite model object into the persistent data cache of the relational database system;

scoring each partition of the at least one scoring data partition by applying the corresponding component of the composite model object to the each partition of the at least one scoring data partition;

upon loading a component of the composite model object and scoring each partition of the at least one scoring data partition, removing a particular component of the composite model object that is no longer being used; and for each partition of the plurality of partitions, building a respective component of the composite model object using respective data from the set of model training data that corresponds to the each partition of the plurality of partitions.

2. The method of claim 1, further comprising:
adding at least one component to the composite model object without having to re-build the composite model object.

3. The method of claim 1, further comprising:
removing at least one component from the composite model object without having to re-build the composite model object.

4. The method of claim 1, further comprising:
selecting by a user one or more data fields associated with the set of model training data upon which the set of model training data is to be partitioned.

5. The method of claim 1, further comprising:
utilizing a partition table associated with the set of model training data upon which the set of model training data is to be partitioned, wherein the partition table includes data fields for partitioning.

6. The method of claim 1, further comprising:
automatically determining one or more data fields associated with the set of model training data upon which the set of model training data is to be partitioned.

7. The method of claim 1, further comprising:
distributing, via the processor, a first scoring data partition of a plurality of scoring data partitions across a plurality of processing nodes of available modeling resources as controlled by an organization data structure;
processing the first scoring data partition in parallel across the plurality of processing nodes of the available modeling resources, as controlled by the organization data structure, to score the first scoring data partition;
distributing, via the processor, a second scoring data partition of the plurality of scoring data partitions across the plurality of processing nodes of the available modeling resources as controlled by the organization data structure; and
processing the second scoring data partition in parallel across the plurality of processing nodes of the available modeling resources, as controlled by the organization data structure, to score the second scoring data partition.

8. The method of claim 1, further comprising:
distributing, via the processor, a first scoring data partition of a plurality of scoring data partitions to a first processing node of available modeling resources as controlled by the organization data structure;
distributing, via the processor, a second scoring data partition of the plurality of scoring data partitions to a second processing node of the available modeling resources as controlled by the organization data structure; and
processing the first and second scoring data partitions concurrently on the first and second processing nodes, respectively, as controlled by the organization data structure, to respectively score the first and second scoring data partitions.

9. The method of claim 1, further comprising:
distributing, via the processor, a first scoring data partition of a plurality of training data partitions to a first processing node of available modeling resources as controlled by the organization data structure;
distributing, via the processor, a second scoring data partition of the plurality of training data partitions to a second processing node of the available modeling resources as controlled by the organization data structure;
processing the first and second scoring data partitions concurrently on the first and second processing nodes, respectively, as controlled by the organization data structure, to respectively score the first and second scoring data partitions;
distributing, via the processor, a third scoring data partition of the plurality of training data partitions across a plurality of processing nodes of the available modeling resources as controlled by the organization data structure; and
processing the third scoring data partition in parallel across the plurality of processing nodes of the available modeling resources, as controlled by the organization data structure, to score the third scoring data partition.

10. A relational database system, comprising:
a processor;
a persistent data cache;
a storing and building module stored in a non-transitory computer-readable medium including instructions that when executed cause the processor to:
store a set of model training data and a composite model object persistently in a relational database management system, wherein a partitioning scheme for the composite model object is associated with a partitioning key, a partitioning technique, and a plurality of partitions;
parse a set of scoring data within the relational database system into at least one scoring data partition based on at least one scoring data partition key associated with the set of scoring data, wherein the at least one scoring data partition is identified by the at least one scoring data partition key and is dynamically loaded into the persistent data cache of the relational database system;
upon determining that a respective component of the composite model object that corresponds to each partition of the at least one scoring data partition will be used for processing the at least one scoring data partition, dynamically load the respective component of the composite model object into the persistent data cache of the relational database system;
score each partition of the at least one scoring data partition by applying the corresponding component of the composite model object to the each partition of the at least one scoring data partition;
upon loading a component of the composite model object and scoring each partition of the at least one scoring data partition, remove a particular component of the composite model object that is no longer being used; and
for each partition of the plurality of partitions, build a respective component of the composite model object using respective data from the set of model training data that corresponds to the each partition of the plurality of partitions.

11. The relational database system of claim 10, further comprising an analytics module stored in a non-transitory computer-readable medium including instructions that when executed cause the processor to:
add at least one component to the composite model object without having to re-build the composite model object.

12. The relational database system of claim 10, further comprising an analytics module stored in a non-transitory computer-readable medium including instructions that when executed cause the processor to:
remove at least one component from the composite model object without having to re-build the composite model object.

13. The relational database system of claim 10, further comprising a visual user interface module stored in the non-transitory computer-readable medium including instructions that when executed cause the processor to provide a graphical user interface or an application program interface that facilitates:
selecting by a user one or more data fields associated with the set of model training data upon which the set of model training data is to be partitioned.

14. The relational database system of claim 10, further comprising a visual user interface module stored in the non-transitory computer-readable medium including instructions that when executed cause the processor to provide a graphical user interface or an application program interface that facilitates:
utilizing a partition table associated with the set of model training data upon which the set of model training data is to be partitioned, wherein the partition table includes data fields for partitioning.

15. The relational database system of claim 10, further comprising a visual user interface module stored in the non-transitory computer-readable medium including instructions that when executed cause the processor to provide a graphical user interface or an application program interface that facilitates:
automatically determining one or more data fields associated with the set of model training data upon which the set of model training data is to be partitioned.

16. The relational database system of claim 10, further comprising:
distribute, via the processor, a first scoring data partition of a plurality of scoring data partitions across a plurality of processing nodes of available modeling resources as controlled by an organization data structure;
process the first scoring data partition in parallel across the plurality of processing nodes of the available modeling resources, as controlled by the organization data structure, to score the first scoring data partition;
distribute, via the processor, a second scoring data partition of the plurality of scoring data partitions across the plurality of processing nodes of the available modeling resources as controlled by the organization data structure; and
process the second scoring data partition in parallel across the plurality of processing nodes of the available modeling resources, as controlled by the organization data structure, to score the second scoring data partition.

17. The relational database system of claim 10, further comprising:
distribute, via the processor, a first scoring data partition of a plurality of scoring data partitions to a first processing node of available modeling resources as controlled by the organization data structure;
distribute, via the processor, a second scoring data partition of the plurality of scoring data partitions to a second processing node of the available modeling resources as controlled by the organization data structure; and
process the first and second scoring data partitions concurrently on the first and second processing nodes, respectively, as controlled by the organization data structure, to respectively score the first and second scoring data partitions.

18. The relational database system of claim 10, further comprising:
distribute, via the processor, a first scoring data partition of a plurality of training data partitions to a first processing node of available modeling resources as controlled by the organization data structure;
distribute, via the processor, a second scoring data partition of the plurality of training data partitions to a second processing node of the available modeling resources as controlled by the organization data structure;
process the first and second scoring data partitions concurrently on the first and second processing nodes, respectively, as controlled by the organization data structure, to respectively score the first and second scoring data partitions;
distribute, via the processor, a third scoring data partition of the plurality of training data partitions across a plurality of processing nodes of the available modeling resources as controlled by the organization data structure; and
process the third scoring data partition in parallel across the plurality of processing nodes of the available modeling resources, as controlled by the organization data structure, to score the third scoring data partition.

19. A non-transitory computer-readable medium storing instructions that, when executed by one or more processors of a computing device, cause the computing device to at least:
store a set of model training data and a composite model object persistently in a relational database management system, wherein a partitioning scheme for the composite model object is associated with a partitioning key, a partitioning technique, and a plurality of partitions;
parse a set of scoring data within the relational database system into at least one scoring data partition based on at least one scoring data partition key associated with the set of scoring data, wherein the at least one scoring data partition is identified by the at least one scoring data partition key and is dynamically loaded into a persistent data cache of the relational database system;
upon determining that a respective component of the composite model object that corresponds to each partition of the at least one scoring data partition will be used for processing the at least one scoring data partition, dynamically load the respective component of the composite model object into the persistent data cache of the relational database system;
score each partition of the at least one scoring data partition by applying the corresponding component of the composite model object to the each partition of the at least one scoring data partition;
upon loading a component of the composite model object and scoring each partition of the at least one scoring data partition, remove a particular component of the composite model object that is no longer being used; and
for each partition of the plurality of partitions, build a respective component of the composite model object using respective data from the set of model training data that corresponds to the each partition of the plurality of partitions.

20. The non-transitory computer-readable medium of claim 19, wherein the instructions further comprise instructions that, when executed by the processor, cause the processor to:

add at least one component to the composite model object without having to re-build the composite model object.

21. The non-transitory computer-readable medium of claim 19, wherein the instructions further comprise instructions that, when executed by the processor, cause the processor to:

remove at least one component from the composite model object without having to re-build the composite model object.

22. The non-transitory computer-readable medium of claim 19, wherein the instructions further comprise instructions that, when executed by the processor, cause the processor to:

select by a user one or more data fields associated with the set of model training data upon which the set of model training data is to be partitioned.

23. The non-transitory computer-readable medium of claim 19, wherein the instructions further comprise instructions that, when executed by the processor, cause the processor to:

utilize a partition table associated with the set of model training data upon which the set of model training data is to be partitioned, wherein the partition table includes data fields for partitioning.

* * * * *